(12) United States Patent
Huang et al.

(10) Patent No.: US 7,990,745 B2
(45) Date of Patent: Aug. 2, 2011

(54) APPARATUS FOR CONTROLLING H-BRIDGE DC-AC INVERTER

(75) Inventors: Yung-Fu Huang, Miaoli County (TW); Yoshihiro Konishi, Hsinchu (TW); Min-Ju Hsieh, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 511 days.

(21) Appl. No.: 12/144,869

(22) Filed: Jun. 24, 2008

(65) Prior Publication Data

US 2009/0168460 A1 Jul. 2, 2009

(30) Foreign Application Priority Data

Dec. 28, 2007 (TW) .............................. 96150745 A

(51) Int. Cl.
*H02M 7/5387* (2007.01)
*H02M 3/24* (2007.01)
(52) U.S. Cl. .......................................... 363/132; 363/98
(58) Field of Classification Search .................... 363/95, 363/98, 131, 132
See application file for complete search history.

(56) References Cited

U.S. PATENT DOCUMENTS

| 5,576,940 | A  | * | 11/1996 | Steigerwald et al. | ........... 363/17 |
| 6,370,039 | B1 | * | 4/2002 | Telefus | ............................ 363/15 |
| 6,654,261 | B2 | * | 11/2003 | Welches et al. | .................. 363/41 |
| 2007/0035975 | A1 | * | 2/2007 | Dickerson et al. | ............ 363/131 |
| 2009/0316458 | A1 | * | 12/2009 | Gonzalez Senosiain et al. | .............................. 363/132 |

OTHER PUBLICATIONS

Taiwan Intellectual Property Office, "Office Action", Mar. 29, 2011, Taiwan.

* cited by examiner

*Primary Examiner* — Jessica Han
(74) *Attorney, Agent, or Firm* — WPAT, PC; Justin King

(57) ABSTRACT

The present invention discloses an apparatus for controlling an H-bridge DC-AC inverter, comprising an H-bridge DC-DC converting circuit capable of converting unstable DC power into stable DC power and a full-bridge DC-AC inverting circuit capable of inverting DC power output from the H-bridge DC-DC converting circuit into AC power. The H-bridge DC-DC converting circuit comprises: a first active switching element and a second active switching element; an inductor capable of storing energy; a first passive switching element and a second passive switching element; and a first capacitor and a second capacitor. The full-bridge DC-AC inverting circuit comprises: a third active switching element, a fourth active switching element, a fifth active switching element and a sixth active switching element; an output inductor; and an output capacitor.

4 Claims, 5 Drawing Sheets

APPARATUS FOR CONTROLLING H-BRIDGE DC-AC INVERTER

BACKGROUND OF THE INVENTION

1. Field of the Invention

The present invention generally relates to an apparatus for controlling an H-bridge DC-AC inverter and, more particularly, to an apparatus for controlling an H-bridge DC-AC inverter using a voltage feed-forward compensation configuration to calculate respective voltage feed-forward compensation parameters under a mode and a buck mode to control the output current waveforms for better performance of a power regulator. Moreover, an AC output current is used as a feed-back control signal to control the output waveforms of the power regulator. Furthermore, the control signals of active switching elements in the DC-AC inverter is synchronous with the AC current so as to reduce the switching loss, ripple current and improve the power conversion rate. The DC-link capacitor can be removed since the ripple current is reduced, which makes the DC-AC inverter more compact.

2. Description of the Prior Art

The H-Bridge DC-AC inverter converts unstable DC distributed power and renewable power into stable DC power and then inverts the DC power into AC power to be used with the AC utility.

Please refer to FIG. 2A and FIG. 2B, which are circuit diagrams of a conventional apparatus for controlling an H-bridge DC-AC inverter and a conventional control configuration thereof. A DC voltage Vdcbus is fed into a proportional-integral regulator 31 outputting an output signal joined by a DC current $i_{dc}$ to enter another proportional-integral regulator 32. The output signal is introduced into the positive input terminals of two comparators 35, 36, while a first high-frequency triangular wave is introduced into the negative input terminal of the first comparator 35 and a second high-frequency triangular wave is introduced into the negative input terminal of the second comparator 36. An output signal from the first comparator 35 is capable of controlling the gate of a first active switching element, and an output signal from the second comparator 36 is capable of controlling the gate of a second active switching element.

An AC current $i_{AC}$ is introduced into a proportional-integral regulator 33 to output an output signal entering the positive input terminal of a comparator 34 and the negative input terminal of the comparator 34 receives a high frequency triangular wave so as to generate an output signal capable of controlling the gates of a third active switching element, a fourth active switching element, a fifth active switching element and a sixth active switching element.

Such an H-bridge DC-AC inverter exhibits a wide operation range ($Vin_{max}/Vin_{min}$) so that there is flexibility in circuit design. However, switching loss such as turn-on loss and turn-off loss may result from hard-switching since active switching elements are used. Moreover, during hard-switching of the switches, switching surge occurs to shorten the lifetime of the switching elements.

Therefore, there is need in providing an apparatus for controlling an H-bridge DC-AC inverter to reduce the switching loss, improve the conversion rate and prolong the lifetime of the switching elements.

SUMMARY OF THE INVENTION

It is an object of the present invention to provide an apparatus for controlling an H-bridge DC-AC inverter using a voltage feed-forward compensation configuration to reduce the switching loss and remove the DC-link capacitor to further make the DC-AC inverter more compact and improve the conversion rate.

In order to achieve the foregoing object, the present invention provides an apparatus for controlling an H-bridge DC-AC inverter, comprising:

an H-bridge DC-DC converting circuit capable of converting unstable DC power into stable DC power, the H-bridge DC-DC converting circuit comprising: a first active switching element and a second active switching element; an inductor capable of storing energy; a first passive switching element and a second passive switching element; and a first capacitor and a second capacitor; and a full-bridge DC-AC inverting circuit capable of inverting DC power output from the H-bridge DC-DC converting circuit into AC power, the full-bridge DC-AC inverting circuit comprising: a third active switching element, a fourth active switching element, a fifth active switching element and a sixth active switching element; an output inductor; and an output capacitor.

The present invention further provides a voltage feed-forward compensation configuration, wherein an AC current flows into a first proportional-integral regulator outputting a signal joined by a DC current to enter a second proportional-integral regulator;

wherein an input voltage and an output voltage are introduced into a buck-mode modulation index calculator and a boost-mode modulation index calculator to perform operations to obtain respective voltage feed-forward compensation parameters, one of which joins the output of the second proportional-integral regulator to generate a mixed signal introduced into the positive input terminals of a first comparator and a second comparator, while a first high-frequency triangular wave is introduced into the negative input terminal of the first comparator and a second high-frequency triangular wave is introduced into the negative input terminal of the second comparator;

wherein an output signal from the first comparator is capable of controlling the gate of a first active switching element, and an output signal from the second comparator is capable of controlling the gate of a second active switching element;

wherein the output voltage is introduced into the positive input terminal of a third comparator and the negative input terminal of the third comparator is grounded so as to generate an output signal capable of controlling the gates of a third active switching element and a sixth active switching element; and wherein the output signal from the third comparator is introduced into a NOT gate to control the gates of a fourth active switching element and a fifth active switching element.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by but not limited to the preferred embodiment as described hereinafter.

Figure 1:
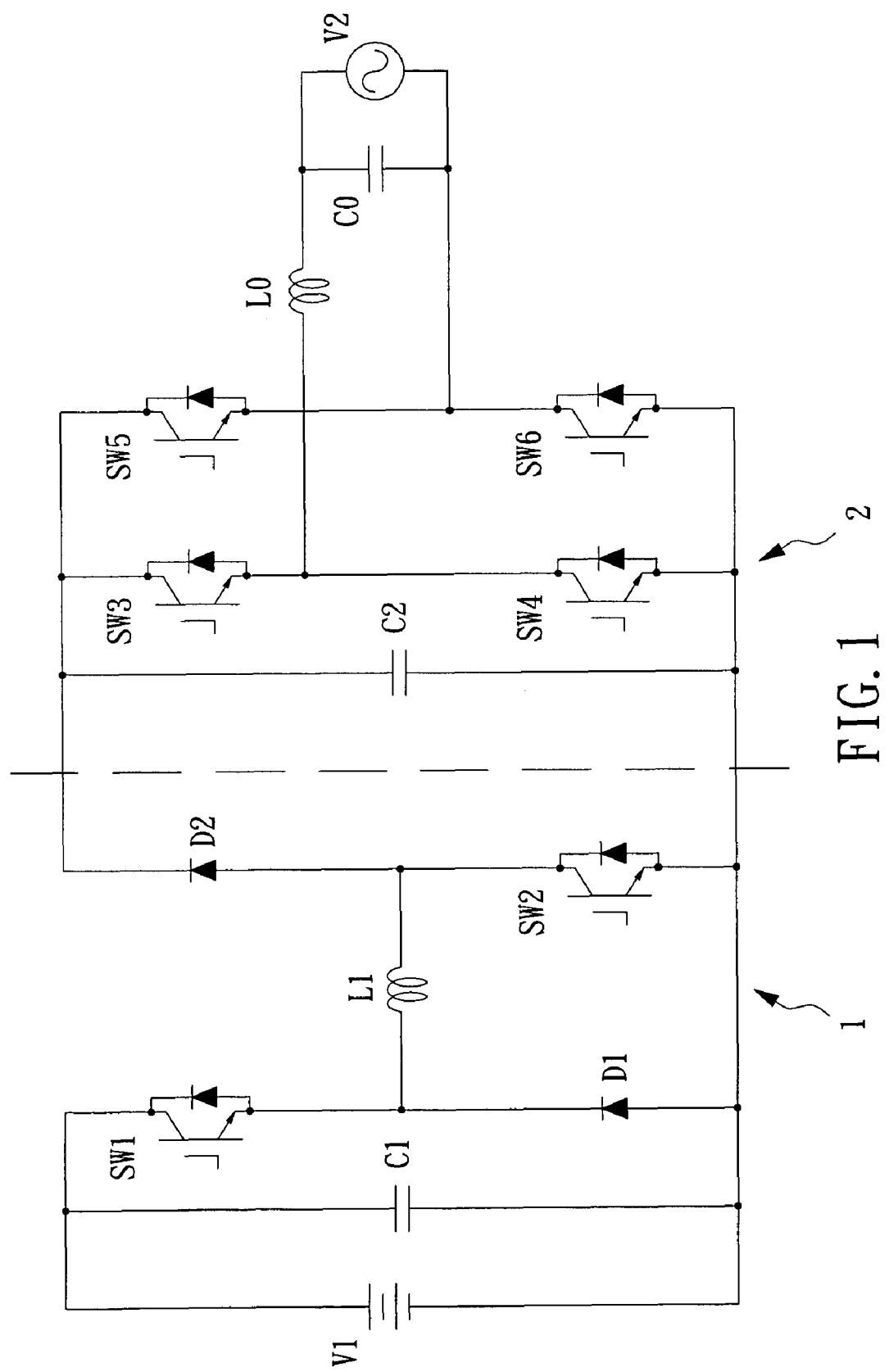
FIG. 1 is a circuit diagram of an H-bridge DC-AC inverter.
Figure 2A:
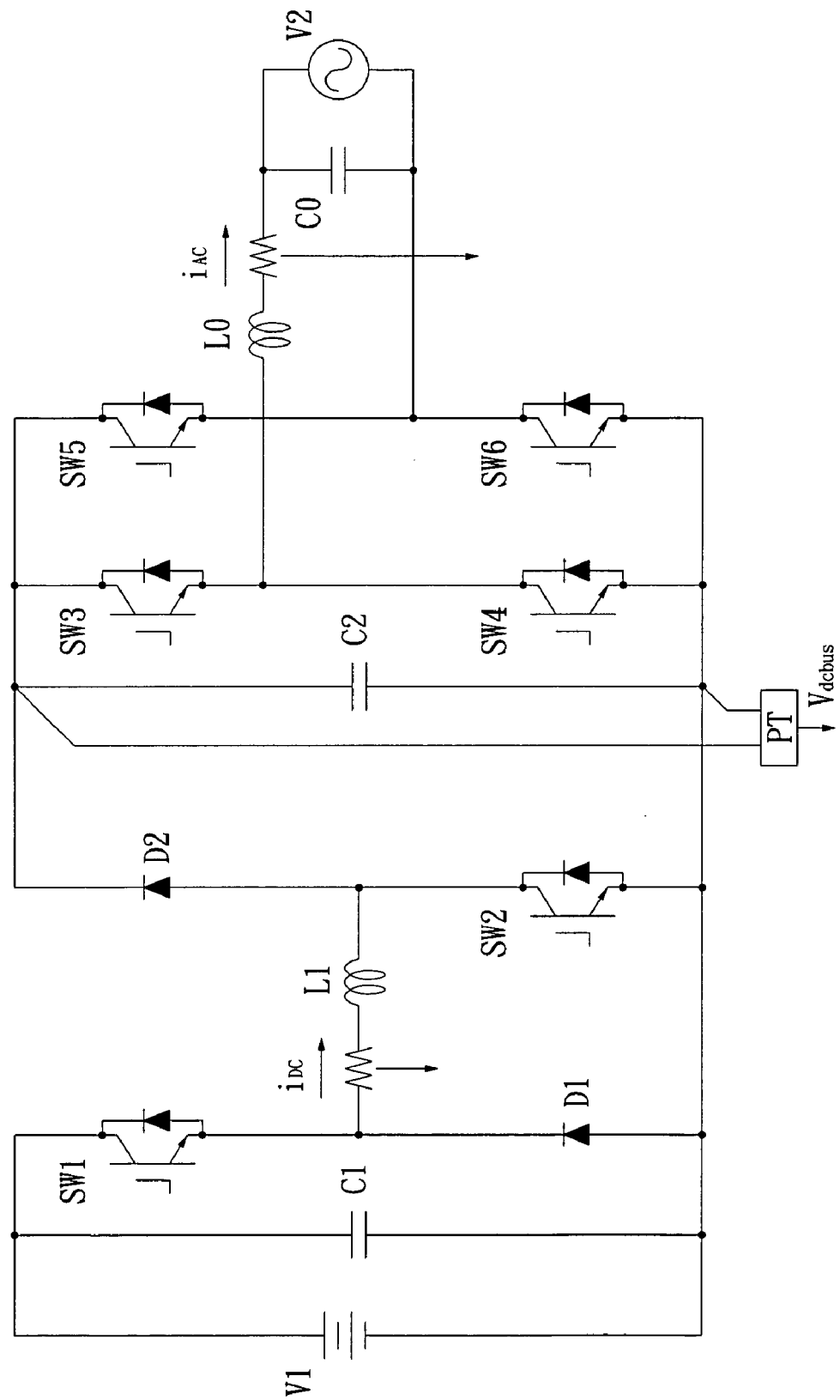
FIG. 2A is a circuit diagram of a conventional apparatus for controlling an H-bridge DC-AC inverter.
Figure 2B:
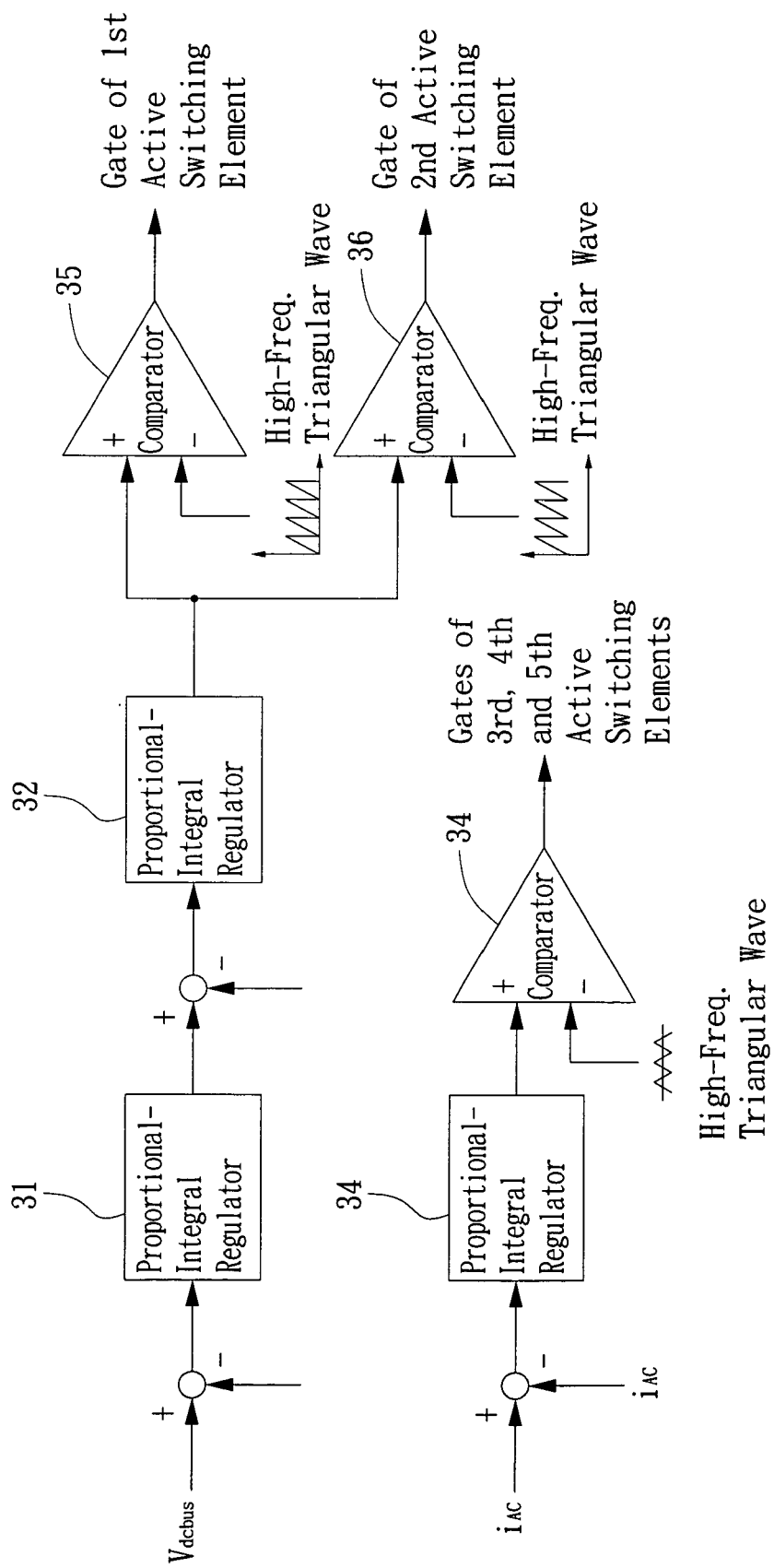
FIG. 2B is a circuit diagram of a conventional control configuration of the apparatus for controlling an H-bridge DC-AC inverter in FIG. 2A.

Please refer to FIG. 1, which is a circuit diagram of an H-bridge DC-AC inverter. In the present invention, an apparatus for controlling an H-bridge DC-AC inverter according to the present invention is disclosed using a voltage feed-forward compensation configuration to calculate respective voltage feed-forward compensation parameters under a mode and a buck mode to control the output current waveforms for better performance of a power regulator.

Figure 3A:
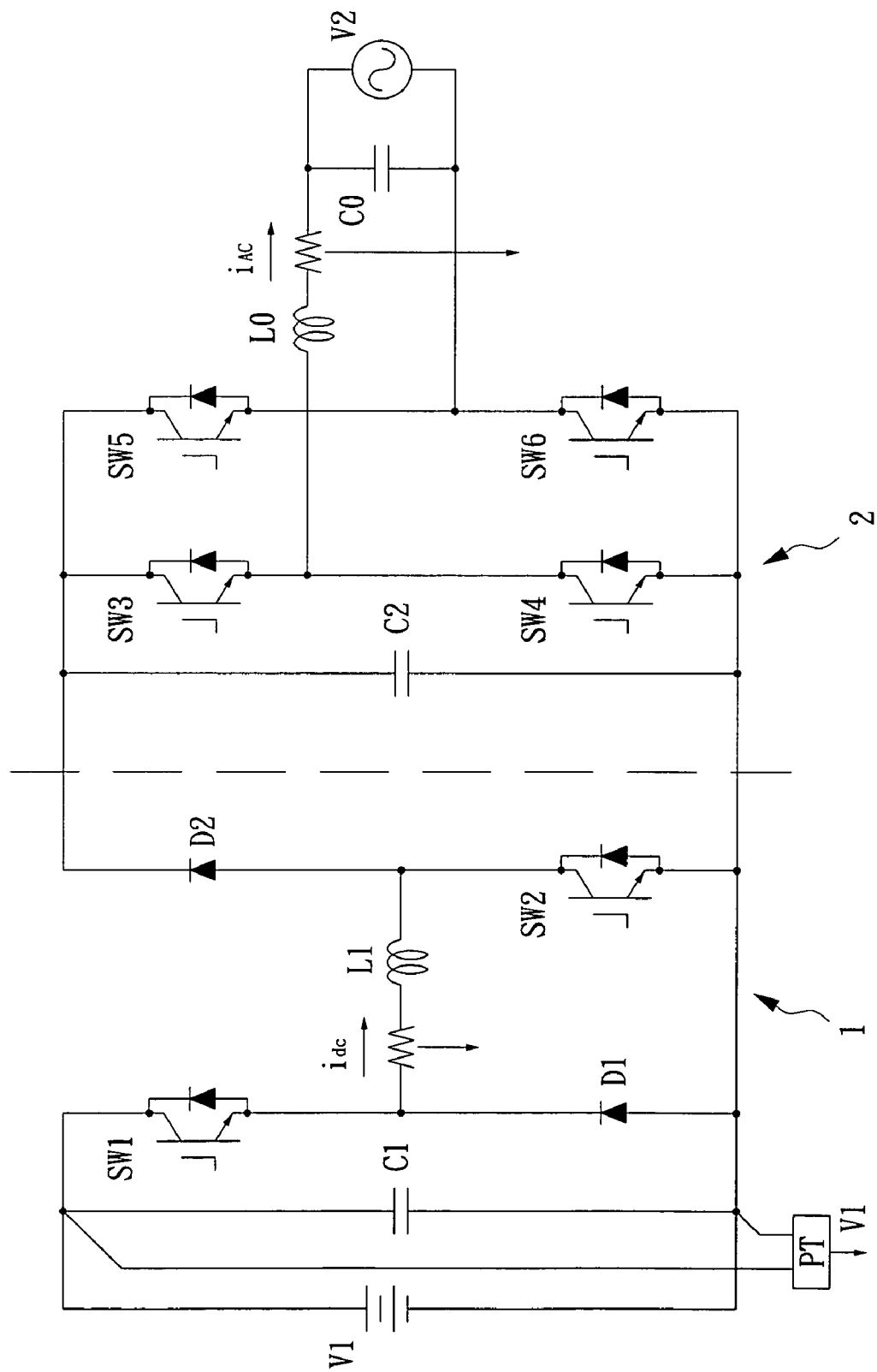
FIG. 3A is a circuit diagram of an apparatus for controlling an H-bridge DC-AC inverter according to the present invention.

Please refer to FIG. 3A, which is a circuit diagram of an apparatus for controlling an H-bridge DC-AC inverter according to the present invention. In FIG. 3A, the apparatus comprises an H-bridge DC-DC converting circuit 1 and a full-bridge DC-AC inverting circuit 2.

The H-bridge DC-DC converting circuit 1 is capable of converting unstable DC power into stable DC power. The H-bridge DC-DC converting circuit comprises: a first active switching element SW1 and a second active switching element SW2; an inductor L1 capable of storing energy; a first passive switching element D1 and a second passive switching element D2; and a first capacitor C1 and a second capacitor C2.

The full-bridge DC-AC inverting circuit 2 is capable of inverting DC power output from the H-bridge DC-DC converting circuit 1 into AC power. The full-bridge DC-AC inverting circuit comprises: a third active switching element SW3, a fourth active switching element SW4, a fifth active switching element SW5 and a sixth active switching element SW6; an output inductor $L_O$; and an output capacitor $C_O$. The output inductor $L_O$ and the output capacitor $C_O$ construct a resonance circuit.

Figure 3B:
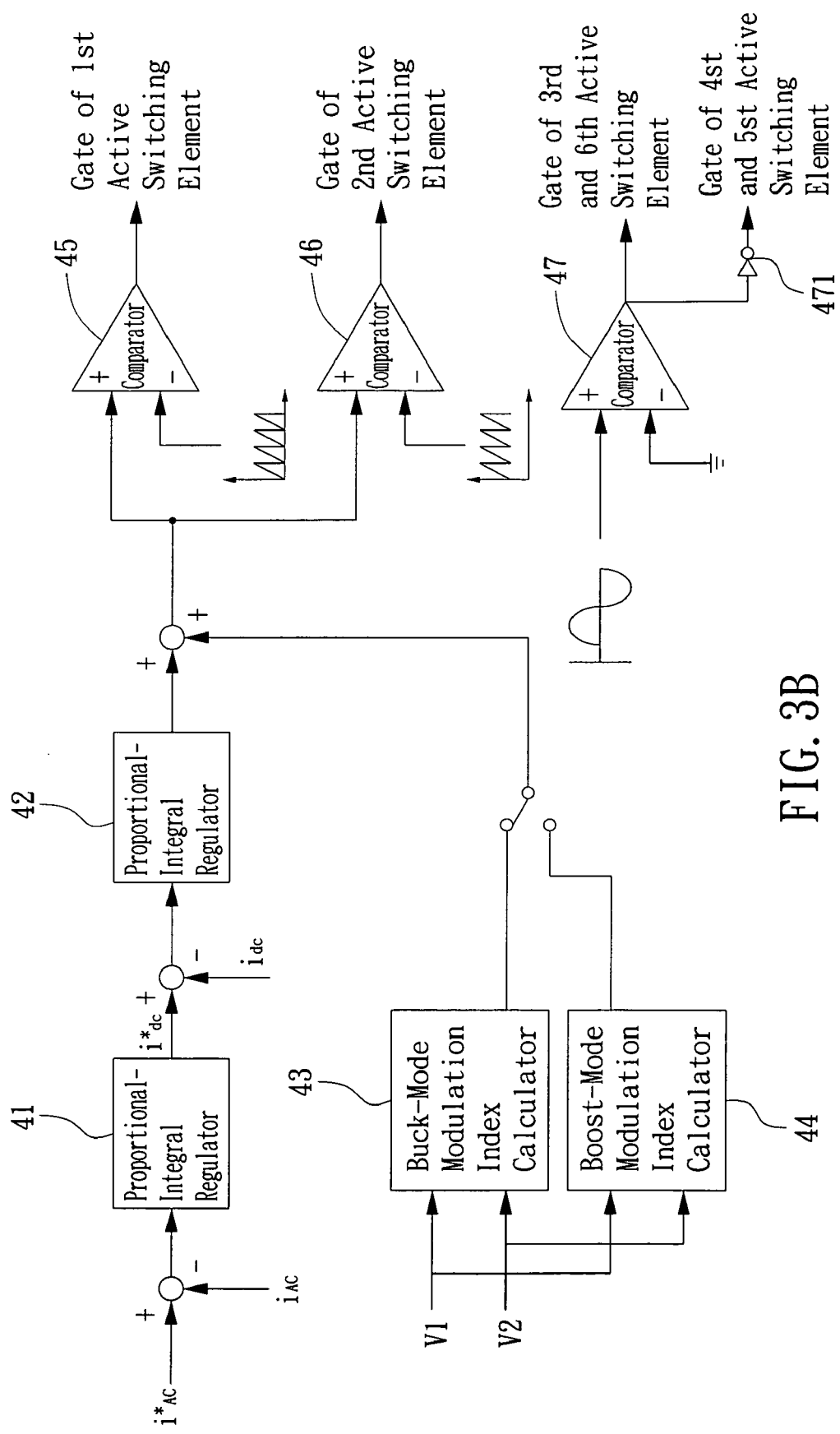
FIG. 3B is a circuit diagram of a voltage feed-forward compensation configuration of the circuit diagram in FIG. 3A.

Please refer to FIG. 3B, which is a circuit diagram of a voltage feed-forward compensation configuration of the circuit diagram in FIG. 3A. In FIG. 3B, a DC input voltage V1 and an AC output voltage are calculated to obtain respective voltage feed-forward compensation parameters.

More particularly, in FIG. 3A and FIG. 3B, an AC current $i_{AC}$ flows into a first proportional-integral regulator 41 outputting a signal joined by a DC current $i_{dc}$ to enter a second proportional-integral regulator 42. The input voltage V1 and the output voltage V2 are introduced into a buck-mode modulation index calculator 43 and a boost-mode modulation index calculator 44 to perform operations to obtain respective voltage feed-forward compensation parameters, one of which joins the output of the second proportional-integral regulator 42 to generate a mixed signal introduced into the positive input terminals of a first comparator 45 and a second comparator 46, while a first high-frequency triangular wave is introduced into the negative input terminal of the first comparator 45 and a second high-frequency triangular wave is introduced into the negative input terminal of the second comparator 46. An output signal from the first comparator 45 is capable of controlling the gate of a first active switching element SW1, and an output signal from the second comparator 46 is capable of controlling the gate of a second active switching element SW2. Moreover, the output voltage V2 is introduced into the positive input terminal of a third comparator 47 and the negative input terminal of the third comparator 47 is grounded so as to generate an output signal capable of controlling the gates of a third active switching element SW3 and a sixth active switching element SW6. Additionally, the output signal from the third comparator 47 is introduced into a NOT gate 471 to control the gates of a fourth active switching element SW4 and a fifth active switching element SW5. Using the third to the sixth active switching elements and the resonance circuit (comprised of the output inductor $L_O$ and the output capacitor $C_O$), the voltage between the resonance circuit is discharged to zero before these active switching elements are turned on so that these active switching elements are turned on at zero voltage to achieve zero-voltage switching. Therefore, the switching loss is reduced to improve the power conversion rate.

When the H-bridge DC-DC converting circuit operates under the buck mode, wherein the first active switching element SW1 performs pulse width modulation (PWM) switching and the second active switching element SW2 is kept off, the output AC waveform is controlled by the DC current $i_{dc}$ on the first inductor L1. However, when the H-bridge DC-DC converting circuit operates under the boost mode, wherein the second active switching element SW2 performs pulse width modulation (PWM) switching and the first active switching element SW1 is kept on, the DC current $i_{dc}$ on the first inductor L1 is not equal to the AC output current $i_{AC}$. Therefore, the AC output current $i_{AC}$ is used as a feed-back control signal for current control compensation to obtain better AC output current waveforms of the power regulator. Moreover, the control signals of the active switching elements (SW3, SW4, SW5, SW6) in the full-bridge DC-AC inverting circuit are synchronous with the AC current so as to reduce the switching loss due to the switching of the first active switching element SW1 and the second active switching element SW2. As a result, the ripple current is reduced and the power conversion rate is improved. The DC-link capacitor can be removed since the ripple current is reduced, which makes the DC-AC inverter more compact.

According to the above discussion, it is apparent that the present invention discloses an apparatus for controlling an H-bridge DC-AC inverter using a voltage feed-forward compensation configuration to reduce the switching loss and remove the DC-link capacitor to further make the DC-AC inverter more compact and improve the conversion rate. Therefore, the present invention is novel, useful and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A voltage feed-forward compensation apparatus, comprising:
   a first proportional-integral regulator, for receiving a DC current;
   a second proportional-integral regulator, coupled to the first proportional-integral regulator, for receiving a first signal comprising the DC current and a AC current;
   a buck-mode modulation index calculator, for receiving an input voltage and generating an input voltage feed-forward compensation parameter;
   a boost-mode modulation index calculator, for receiving an output voltage and generating an output voltage feed-forward compensation parameter;

a first comparator, having a positive terminal and a negative terminal, and receiving a mixed signal and a first high-frequency triangular wave and generating a output signal to control gate of a first active switching element, wherein the positive terminal of the first comparator is configured to receive the mixed signal comprising a second signal from the second proportional-integral regulator and the input voltage feed-forward compensation parameter/the output voltage feed-forward compensation parameter, and the negative thereof is configured to receive the first high-frequency triangular wave;

a second comparator, having a positive terminal and a negative terminal, and receiving the mixed signal and a first high-frequency triangular wave and generating a output signal to control gate of a second active switching element, wherein the positive terminal of the second comparator is configured to receive the mixed signal comprising the second signal from the second proportional-integral regulator and the input voltage feed-forward compensation parameter/the output voltage feed-forward compensation parameter, and the negative thereof is configured to receive the first high-frequency triangular wave; and a third comparator, having a positive terminal and a negative terminal, and receiving the output voltage and generating a output signal to control a third active switching element and the sixth active switching element, wherein the positive terminal of the third comparator is configured to receive the input voltage and the negative terminal therefore is connected to ground;

wherein the output signal from the third comparator is introduced into a NOT gate to control the gates of a fourth active switching element and a fifth active switching element.

2. The voltage feed-forward compensation apparatus of claim 1, further comprising:
   an H-bridge DC-AC inverter, coupled to the comparators, comprising:
   an H-bridge DC-DC converting circuit capable of converting unstable DC power into stable DC power, the H-bridge DC-DC converting circuit comprising;
   the first active switching element and the second active switching element;
   an inductor capable of storing energy;
   a first passive switching element and a second passive switching element; and
   a first capacitor and a second capacitor; and
   a full-bridge DC-AC inverting circuit capable of inverting DC power output from the H-bridge DC-DC converting circuit into AC power, the full-bridge DC-AC inverting circuit comprising;
   the third active switching element, the fourth active switching element, the fifth active switchin element and the sixth active switchin element;
   an output inductor; and
   an output capacitor.

3. The voltage feed-forward compensation apparatus of claim 2, wherein voltage feed-forward compensation parameters used in the H-bridge DC-AC inverter are acquired by performing operations on DC input voltages and output voltages.

4. The voltage feed-forward compensation apparatus of claim 2, wherein AC output currents and an inductor current in the DC-DC converting circuit are measured using current feed-back control.

* * * * *